July 14, 1931.  J. K. LENCKE ET AL  1,814,318
IMPULSE COUPLING
Filed Dec. 3, 1929   2 Sheets-Sheet 1

INVENTORS.
JOHN K. LENCKE
HERMAN SCHMID.
BY
ATTORNEY.

July 14, 1931. J. K. LENCKE ET AL 1,814,318
IMPULSE COUPLING
Filed Dec. 3, 1929 2 Sheets-Sheet 2
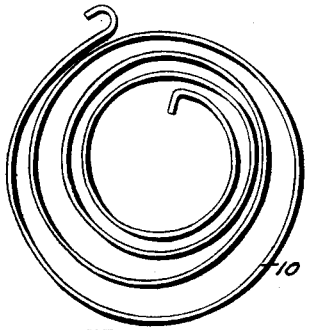
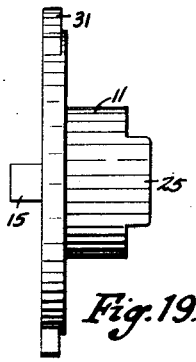
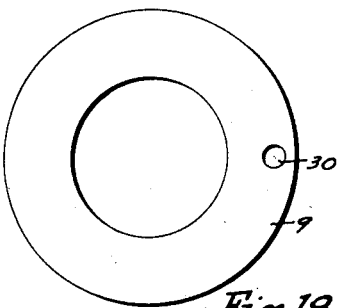
Fig. 20. Fig. 19. Fig. 18.
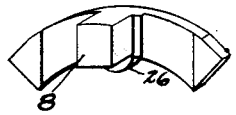
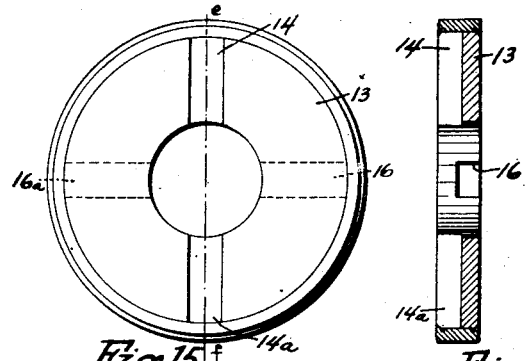
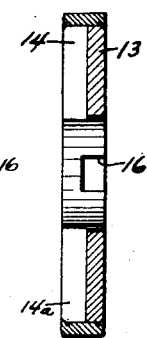
Fig. 17. Fig. 15. Fig. 16.
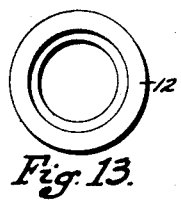
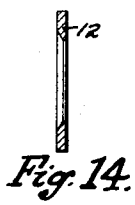
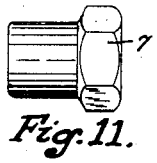
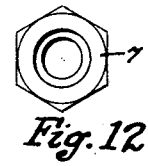
Fig. 13. Fig. 14. Fig. 11. Fig. 12.
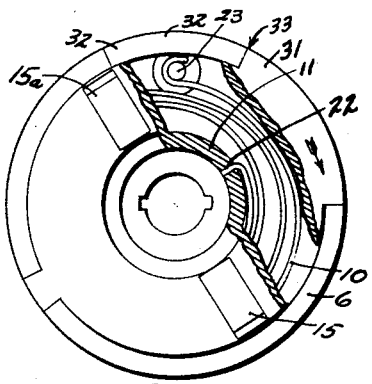
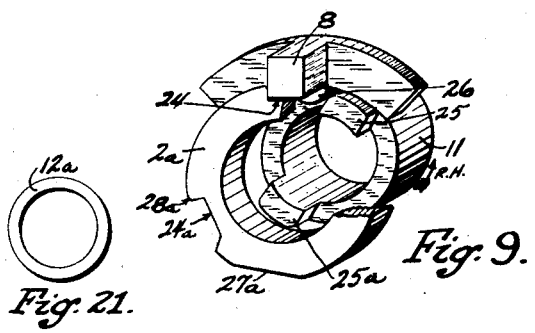
Fig. 10. Fig. 21. Fig. 9.
Fig. 22.
INVENTORS.
JOHN K. LENCKE.
HERMAN SCHMID.
BY
ATTORNEY.

Patented July 14, 1931

1,814,318

UNITED STATES PATENT OFFICE

JOHN K. LENCKE AND HERMAN SCHMID, OF KINGSTON, NEW YORK, ASSIGNORS TO APOLLO MAGNETO CORPORATION, A CORPORATION OF DELAWARE

IMPULSE COUPLING

Application filed December 3, 1929. Serial No. 411,294.

This invention relates to improvements in impulse couplings and particularly those used in connection with magnetos or electrical generators for supplying ignition current to internal combustion engines and especially to impulse couplings wherein at low speed the magneto is locked against rotation until at a predetermined advance of the driving means the magneto is released and is impelled at a comparative high speed, causing it to generate a spark of sufficient intensity to ignite the gaseous mixture in the cylinder of the engine to which it is connected.

Many of the engines to which impulse couplings are applicable are required to run at slow speeds, such as when an engine in an automobile truck is idling and one object of this invention is to provide for this condition by an improved construction which only allows the locking mechanism to engage at starting speeds much below idling speeds. This eliminates wear on the coupling.

Some applications of impulse couplings require the rotation of them in one direction or the other, for instance some engines require the magneto to rotate clockwise, while others may require anticlockwise rotation. By this invention this condition is met by the rearrangement of certain parts thereby eliminating the necessity of "right" and "left" hand parts.

Another object in this invention is to provide an impulse coupling which will not engage itself should the engine rotate in reverse direction as is sometimes caused by back firing.

A further object is to provide an impulse coupling in which all of the operating parts are enclosed within a case which is removable without disturbing any of the operating parts.

Other objects and improvements of the invention are set forth and described in the following description and accompanying drawings:—

Figure 9 is a view showing some of the main operating parts and their relation to each other.

Figure 10 is a view of a partial assembly cut-away to show the spring assembly.

Figure 11 is a side view of the sleeve nut for mounting the coupling on the magneto shaft.

Figure 12 is an end view of Figure 11.

Figure 13 is a view of the retaining washer.

Figure 14 is a sectional view of Figure 13.

Figure 15 is a view showing the intermediate driving member.

Figure 16 is a sectional view of Figure 15 on line e—f.

Figure 17 is a view showing one of the locking members.

Figure 18 is a view of the spacing plate.

Figure 19 is another view of Figure 7 showing the releasing projections.

Figure 20 is a view of one of the operating springs.

Figure 21 is a view of the bearing washer, and

Figure 22 is a side view of Figure 21.

In the accompanying drawings like numerals identify like parts throughout.

Figure 1:
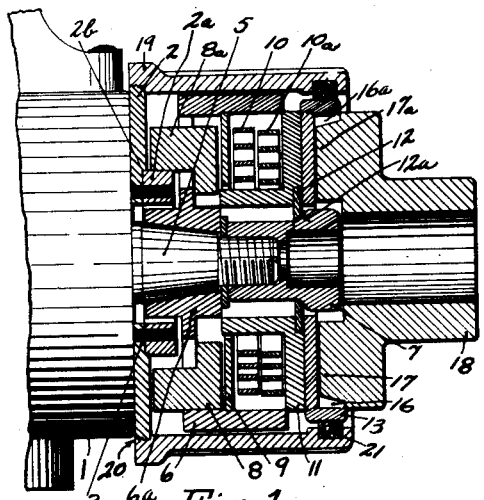
Figure 1 is a side view of one end of a magneto having the impulse coupling attached and shown in section.
Figure 2:
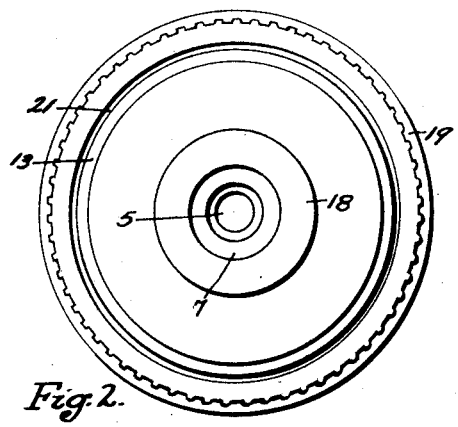
Figure 2 is an end view of Figure 1.
Figures 3, 4:
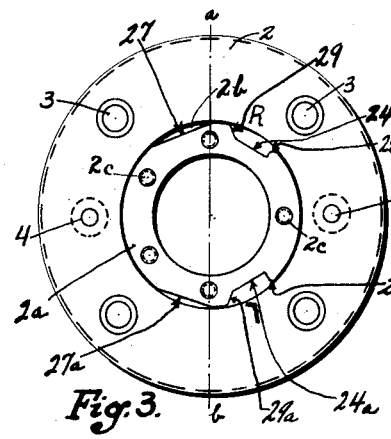
Figure 3 is a view of the fixed member or catch plate.
Figure 4 is a sectional view on line a—b Figure 3.
Figure 5:
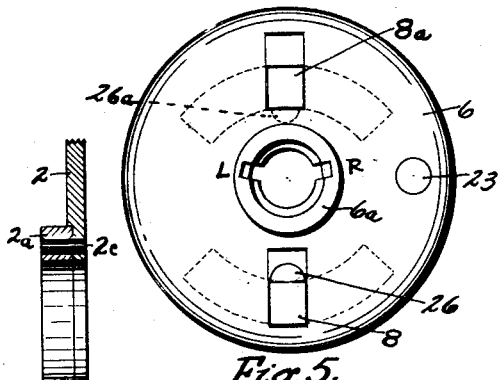
Figure 5 is a rear view of the impulse coupling casing.
Figure 7:
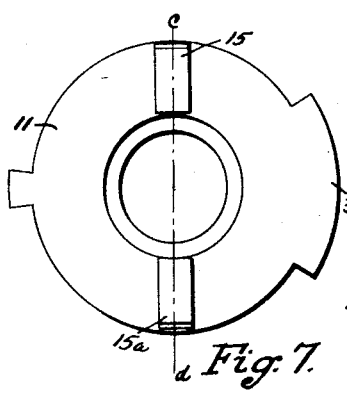
Figure 7 is a view of the spring winding and releasing member.
Figures 6, 8:
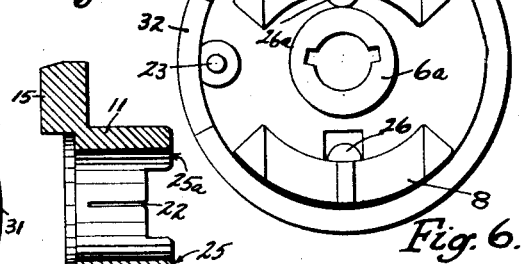
Figure 6 is a view of Figure 5 looking into the casing with the locking members therein.
Figure 8 is a sectional view of Figure 7 on line c—d.

To illustrate and describe the invention there is shown in Figure 1 the drive shaft end of a magneto having mounted on it the impulse coupling. To end plate 1 of the magneto is secured catch plate 2 by bolts or screws passing through holes 3 and located by dowel pins in holes 4 shown in Figure 3, and this plate has a cam portion $2^a$ projecting outwardly and recessed into the plate at $2^b$ and held rigidly thereto by rivets $2^c$. On magneto shaft 5 is mounted casing 6 (Figures 5 and 6) secured thereto by the tapered and keyed boss $6^a$ integral therewith and by sleeve nut 7 (Figures 11 and 12). Inside of casing 6 is mounted locking members 8 and $8^a$, a dividing plate 9 (Figure 18), having a hole 30 which locates on pin 23 in casing 6, springs 10 and $10^a$ (Figure 20) and spring winding and releasing member 11 (Figures 7-8 and 19) which are held in operating relation to each other by washers 12, $12^a$ which are placed loosely between member 11 and the conical head of nut 7.

Intermediate driving member 13 (Figures 15 and 16) has slots 14 and $14^a$ on one side which loosely engage lugs 15 and $15^a$ on member 11 and on the opposite side slots 16 and $16^a$, at right angles to slots 14 and $14^a$, which are loosely engaged by lugs 17 and $17^a$ of driving member 18.

Casing 19 which encloses the operating parts of the coupling is threaded and screwed on to catch plate 2 at 20 and has in its outer end felt ring 21 which is in contact with the edge of intermediate driving member 13 thereby excluding dust or other foreign matter which would interfere with the operation of the coupling.

In operation, driving member 18 (which can be made of any suitable form or dimension to fit the particular engine shaft to which it is fitted) has lugs 17 and $17^a$ engaging slots 16 and $16^a$ in member 13 which has its slots 14 and $14^a$ engaging lugs 15 and $15^a$ of member 11. When the engine is revolved slowly as when cranked by hand, member 11 carries with it springs 10 and $10^a$ which have their inner ends securely fixed in slot 22 of member 11 and their outer ends engaging pin 23 in casing 6 as shown in Figure 10. These springs are normally under sufficient restraint to hold the member 11 and casing 6 in fixed relation under ordinary conditions so as to provide for practically rigid driving connection between the armature shaft 5 and driving member 18. Revolving member 11 in relation to casing 6 winds springs 10 and $10^a$, these being normally held under restraint by projection 31 on member 11 engaging projection 32 on casing 6 as shown at 33 in Figure 10. The springs yield sufficiently to permit the member 11 to revolve somewhat further when 11 is turned in the direction of the arrow, Figure 10, while at the same time either of the locking members 8 or $8^a$ (which are freely movable in the radial slots in casing 6) falls into notch or slot 24 of catch plate 2. The member 11 now rotates with respect to casing 6 against the force of the springs until the projecting cam 25 or $25^a$ thereon engages projection 26 on member 8 forcing member 8 out of engagement with notch 24. The springs, being under tension by the forward movement of member 11 and the retardation of casing 6, then throw the casing forward giving the armature of the magneto connected thereto the necessary sharp initial impulse to generate the starting spark. The casing then catches up with the member 11 and they rotate together during the remainder of the operation of the magneto. This result is effected by the fact that the members 8 and $8^a$ are so mounted in casing 6 that by centrifugal force they move away from the center axis of the device and, after starting, the members 8 and $8^a$ fly out far enough to avoid engaging notch 24, at a predetermined speed.

To guard against the members 8 and $8^a$, engaging notch 24 and causing the consequent forward impulse to the armature to be repeated an unnecessary number of times before the device reaches the speed of its normal operation such as when the vehicle propelled by the engine on which the coupling is used is brought to a standstill and the engine allowed to idle, there is provided on catch plate 2 an inclined surface 27 which will prevent members 8 and $8^a$ from engaging notch 24 at any speeds, except real starting speed. At other speeds where centrifugal force is not sufficient to move 8 and $8^a$ out of contact with notch 24, these members moving up incline 27 are imparted a momentum which will, upon reaching notch 24, cause member 8 to leap over this notch or, at most, strike the rounded corner 28 which they easily slip past. Thus the impulse coupling operates to give one or more impulses to the magneto only at relatively low starting speeds and when the speed of the engine is normal or is dropped to idling speed, the coupling does not come into operation.

The coupling is shown assembled for rotating the magneto in right hand or clockwise rotation but it is often necessary to rotate it left hand or anti-clockwise. This is provided for in catch plate 2 by providing notch $24^a$, inclined surface $27^a$ and rounded corner $28^a$ denoted "L" and in casing 6 two keyways "R" and L. To change the rotation of the coupling from right to left, mount catch plate 2 with the letter L above the magneto shaft, reverse the springs in casing 6 and when under proper tension the projection 31 of member 11 will be located to the left of projection 32 instead of to the right as shown in Figure 10, place the proper keyway in casing 6 over the key in the magneto shaft.

The rear or trailing side of notch 24 in catch plate 2 is inclined so as to form a cam 29. This is done to provide an automatic release of members 8. In case of reverse rotation (as when the engine back fires) the members 8 are forced out of notch 24 by cam 29 without causing any reverse rotation of the magneto or any undue strains on any of the parts of the impulse coupling.

In order to properly apprehend this invention it is necessary to define the term "starting speed", as used herein, as the very slow speed at which the magneto armature is revolved when cranking by hand or with the usual electric starter. This in many cases is at the rate of 50 revolutions per minute or less as distinguished from an idling speed of from 100 to 500 or more revolutions per minute and a running speed of from 500 to 5000 revolutions per minute. It is quite important to bear this distinction in mind as by this invention, while the magneto will be operated to give a satisfactory spark at starting speeds, the coupling will not operate at other speeds as is the case with many couplings of the prior art. This eliminates having the coupling drop into engagement at idling speeds which causes undue wear and noise.

We claim:—

1. In combination with a generator having a shaft, a catch plate secured to the generator, a coupling mechanism carried by said shaft including an intermediate driving member, a nut member for securing the coupling mechanism to the shaft and having a beveled surface for maintaining the alignment of the intermediate driving member with the other coupling parts, and a casing secured to said plate and forming with said intermediate driving member a chamber enclosing the coupling mechanism.

2. In combination with a generator, having a shaft and means for revolving said shaft, impulse starter mechanism interposed between said shaft and revolving means, said mechanism including a member operated by centrifugal force and adapted to hold said shaft from being revolved by said means at predetermined speeds, and a cam fixed to the generator and adapted to engage said member, said cam having a notch therein adapted to hold said member and a flattened portion on said cam to cause said member to ride over said notch except at a predetermined speed.

3. In an impulse coupling, a catch element in the form of a ring having a plurality of recesses in its outer surface, one side of said recesses being abrupt and the other side sloping and a flattened surface adjacent the sloping side of each of said recesses.

4. In an impulse coupling for magnetos having impulse springs, a catch plate, a catch element fixed on said plate, said element having a plurality of recesses and flattened surfaces, said flattened surfaces being so positioned that by inverting the position of said plate and reversing of said springs the operating rotation of the coupling is reversed.

In testimony whereof we affix our signatures.

JOHN K. LENCKE.
HERMAN SCHMID.